United States Patent

Horie

[11] Patent Number: 5,844,475
[45] Date of Patent: Dec. 1, 1998

[54] APPARATUS FOR ALARMING ABNORMALITY OF TIRE AIR PRESSURE

[75] Inventor: Hiroto Horie, Akashi, Japan

[73] Assignee: Sumitomo Rubber Industries, Inc., Osaka, Japan

[21] Appl. No.: 727,764

[22] Filed: Oct. 8, 1996

[30] Foreign Application Priority Data

Oct. 11, 1995 [JP] Japan ................................. 7-262898

[51] Int. Cl.⁶ ................................................. B60C 23/00
[52] U.S. Cl. ...................... 340/442; 340/438; 340/459; 340/525; 364/187
[58] Field of Search ................... 340/442, 461, 340/462, 459, 525, 438; 307/10.3, 10.6; 364/187, 188

[56] References Cited

U.S. PATENT DOCUMENTS

| | | | |
|---|---|---|---|
| 3,975,708 | 8/1976 | Lusk et al. | 340/438 |
| 4,222,031 | 9/1980 | Okamoto et al. | 340/525 |
| 4,271,402 | 6/1981 | Kastura et al. | 340/459 |
| 4,381,458 | 4/1983 | Anstey et al. | 307/66 |
| 4,816,806 | 3/1989 | Ohishi et al. | 340/514 |
| 5,019,799 | 5/1991 | Oshiage et al. | 340/438 |
| 5,155,663 | 10/1992 | Harase et al. | 361/395 |
| 5,424,994 | 6/1995 | Nagasawa | 365/229 |
| 5,463,374 | 10/1995 | Mendez et al. | 340/442 |
| 5,541,572 | 7/1996 | Okamoto et al. | 340/438 |

FOREIGN PATENT DOCUMENTS

| | | |
|---|---|---|
| 0036755 | 9/1981 | European Pat. Off. . |
| 4303583 | 8/1994 | Germany . |
| 94/06640 | 3/1994 | WIPO . |

*Primary Examiner*—Jeffery A. Hofsass
*Assistant Examiner*—Ashok Mannava

[57] ABSTRACT

An apparatus for alarming abnormality of tire air pressure, including: a display section capable of displaying information in a normal operation mode and information in a special operation mode; an input switch capable of entering ON/OFF information; and a non-volatile memory whose information in the special mode does not disappear even if an ignition is turned off wherein the apparatus is configured so that the special operation mode is entered by turning on the ignition while pressing the input switch, and the information in the special operation mode is displayed on the display section. The apparatus can prevent a dangerous action such that the driver reads a failure code or the position of a tire having abnormal internal air pressure while driving a vehicle.

6 Claims, 3 Drawing Sheets

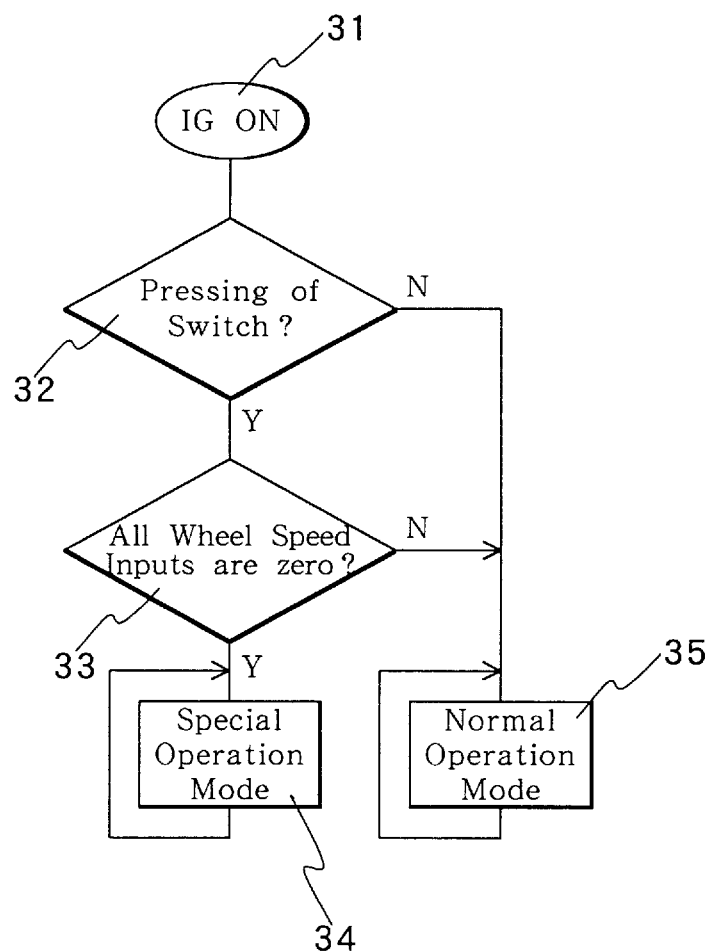

APPARATUS FOR ALARMING ABNORMALITY OF TIRE AIR PRESSURE

BACKGROUND OF THE INVENTION

The present invention relates to an apparatus for alarming abnormality of tire air pressure, more specifically to an apparatus for alarming abnormality of tire air pressure that is configured to display the information (information in special operation mode), such as a position of abnormal tire, presence of a failure in the apparatus for alarming abnormality of tire air pressure, and type of the failure that would deviate the attention of a driver to be dangerous for the driver when it is displayed during driving, only when the vehicle is stopped.

It is desirable that the tire's air pressure is essentially within a range which is set for a vehicle, however, the air pressure drops due to puncture, damage to a valve or air leak from an inner liner, or the air pressure rises due to excessive load weight or other cause. When a vehicle continues driving with the air pressure being dropped or risen, the tire might burst to cause an accident in a worst case. Thus, many apparatuses have been proposed which alarm the abnormality of tire air pressure. For example, there are proposed a method of comparing wheel speed of four wheels; a method of judging information from an internal pressure sensor mounted on a wheel; a method of judging tire air pressure from displacement of a resonance frequency obtained by feeding the wheel speed of four wheels into FFT analyzer; and a method of using frequency of a suspension under a spring.

In the case where those apparatuses for alarming abnormality of tire's internal air pressure detects the abnormality of tire's internal air pressure, in order to indicate which tire is abnormal if there is provided only one indication section, it is only way to indicate it by the blinking times of a lamp, or by connecting detected result to an external unit (a device capable of displaying characters, for example, monitor for navigation or dot-matrix) to indicate that information. However, it is costly to provide such an external unit, and it is too complicated for the driver during driving a vehicle to recognize the contents of the information displayed by blinking, thereby hindering the driving and becoming dangerous.

Therefore, it is necessary to provide a unit capable of activating ECU (Electronic Control Unit) after stopping a vehicle at a safety place, observing the blinking numbers of the lamp and the contents of the characters displayed on the external unit to allow the position of the abnormal tire to be recognized.

Moreover, some apparatuses for alarming abnormality of tire's internal air pressure capable of indicating information on the display section by interlocking with ECU have a function of displaying failure of the inside or outside of the apparatus itself, and thus equipped with a non-volatile memory to store the contents of that failure as a failure code and a display section (lamp or external unit) on which the stored failure code is displayed. The indication on the display section is started by a trigger to ECU to which the non-volatile memory is connected. The trigger to ECU indicates the ON-information to be given to ECU and it means an instruction to conduct different operation that is executed by turning on and off the power or changing the potential on the wire connected to ECU.

When, actually, the apparatus is handed to a dealer's office to be repaired, the trigger to ECU is made in the following methods to allow it to be recognized by a microcomputer in ECU so as to display the failure code on the display section: (1) the specific terminal from ECU is short-circuited to the body earth or GND (earth) terminal with a wire to change the potential of the specific terminal; (2) the signal fed to ECU such as braking signal is rapidly turned on and off for a specific time to make the ECU recognize that the braking operation is specific; (3) a communication is conducted by connecting an exclusive unit to the apparatus.

However, any method in (1)–(3) requires a special unit or complicated procedure that conducts timing operation.

In view of the above circumstances, it is an object of the present invention to provide an apparatus for alarming abnormality of tire air pressure wherein, other than a normal operation mode that is entered only by turning on the ignition (starting of an engine), a special operation mode that is not entered (turned on or switched) during driving is set; the driver can concentrate the attention to the driving and is safe since no information that deviates the attention of the driver during driving is indicated and no troublesome operation is required; and it is capable of entering the special operation mode with simple operation while stopping the vehicle and capable of knowing the information in the special operation mode.

SUMMARY OF THE INVENTION

In accordance with the present invention, there is provided an apparatus for alarming abnormality of tire air pressure, including: a display section capable of displaying information in a normal operation mode and information in a special operation mode other than the information in the normal operation mode; an input switch capable of entering ON/OFF information; and a non-volatile memory whose information in the special mode does not disappear even if an ignition is turned off wherein the apparatus is configured so that the special operation mode is entered by turning on the ignition while pressing the input switch, and the information in the special operation mode is displayed on the display section.

It is desirable that the special operation mode is a self diagnosis mode.

It is also desirable that the special operation mode is an abnormal tire position display mode.

Moreover, it is also desirable that a backup power supply is connected to a volatile memory instead of the non-volatile memory.

In accordance with another aspect of the present invention, there is provided an apparatus for alarming abnormality of tire air pressure, including: a display section capable of displaying information in a normal operation mode and information in a special operation mode other than the information in a normal operation mode; an input switch capable of entering ON/OFF information; a non-volatile memory whose information in the special mode does not disappear even if an ignition is turned off; and a wheel speed sensor wherein the apparatus is configured so that the special operation mode is entered if the wheel speed sensor has detected that all the wheels do not move when turning on the ignition while pressing the input switch, and the information in the special operation mode is displayed on the display section.

It is desirable that the special operation mode is a self diagnosis mode.

It is also desirable that the special operation mode is an abnormal tire position display mode.

Moreover, it is also desirable that a backup power supply is connected to a volatile memory instead of the non-volatile memory.

In the apparatus for alarming abnormality of tire air pressure in the present invention, the normal operation mode means a mode that is entered only by turning on the ignition (starting of an engine). This normal operation mode includes a tire depressurization monitoring mode and a self diagnosis mode that does not disturb the driver even if they are displayed on the display section during driving, since they are simple information.

On the other hand, the special operation mode includes a mode that requires to display a complicated information that is difficult to be recognized at a glance such as depressurized tire display mode and failure code mode. The depressurized tire display mode is to display the position of the depressurized tire. The failure code display mode is to display the presence of internal and external failures of the main body (apparatus for alarming abnormality of tire air pressure) and the type of the failure with a failure code expressed by simple symbols, alphanumeric characters, HIRAGANA-characters, and KATAKANA-characters so that they are fairly complicated information, taking time for reading.

In the present invention, the information that takes such time for reading is specified as the information in special operation mode and configured not to be entered only by turning on the ignition as in the case of normal operation mode. Such configuration provides an effect that a driver can concentrate on the driving and is safe, without disturbed by the information in the special operation mode.

Moreover, the operation for entry into the special operation mode in the present invention uses two configurations (1) that the operation is executed when the ignition is turned on while pressing the input switch connected to ECU that is used normally for other purpose or (2) that the operation is executed when ignition is turned on while pressing the input switch connected to ECU that is used normally for other purpose and, further, after it is confirmed that the wheel speed is zero.

The configuration (1) or (2) provides the effects that it is possible to enter the special operation mode with a simple operation in comparison with a prior art that the ignition is turned on while pressing the input switch. Moreover, although the information in the special operation mode is displayed only for a few seconds or minutes after the ignition is turned on (engine is started), the vehicle is surely stopped for a few seconds or minutes after the engine is started, so that no display is made during driving.

Since a complicated information is transmitted in the special operation mode, the lamp is obliged to blink in a complicated pattern on the display section consisting of a lamp. Therefore, when the special operation mode is entered during driving, it causes the driver's attention to be dangerously distracted, however, the present invention does not cause such fear, and provides safety.

Moreover, in the configuration (2), the special operation mode will not be entered unless the wheel speed is zero even in the situation where the ignition must be switched from OFF to ON state while the vehicle is moving, for example, when the vehicle is still moving after the gear is set to neutral due to the engine failure. Thus, the driver's attention will not be distracted by the blinking lamp during trouble, with more enhanced safety.

BRIEF EXPLANATION OF THE DRAWINGS

FIG. 5 is a flow chart of the apparatus for alarming abnormality of tire air pressure shown in FIG. 4.

DETAILED DESCRIPTION

Figure 1:
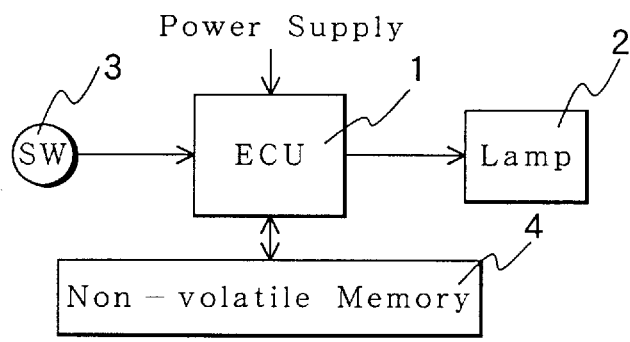
FIG. 1 is an illustration of one embodiment of an apparatus for alarming abnormality of tire air pressure of the present invention.
Figure 2:
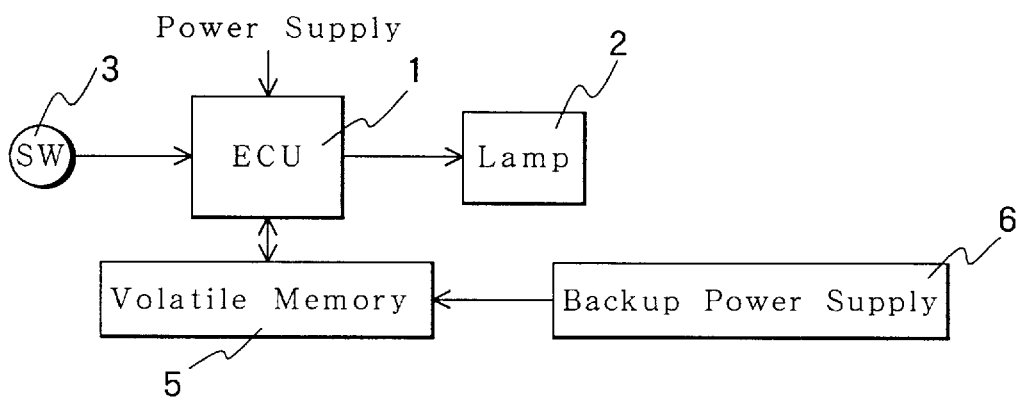
FIG. 2 is an illustration of another embodiment of an apparatus for alarming abnormality of tire air pressure of the present invention.
Figure 3:
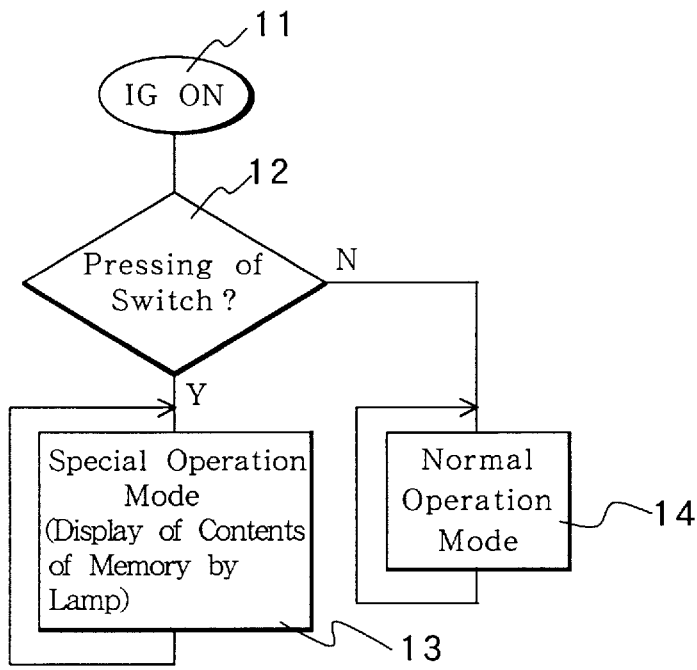
FIG. 3 is a flow chart of the apparatus for alarming abnormality of tire air pressure shown in FIGS. 1 and 2.

Next, one embodiment of an apparatus for alarming abnormality of tire air pressure of the invention is described based on FIGS. 1 to 3. This embodiment has the configuration (1). In this apparatus for alarming abnormality of tire air pressure, as shown in FIG. 1, an ECU1 is equipped with a lamp 2 as a display section, an input switch 3, and a non-volatile memory 4. Moreover, as shown in FIG. 2, it is possible to connect a volatile memory 5 and a backup power supply 6 to ECUI instead of the non-volatile memory 4.

The lamp 2 transmits a plurality of information by changing numbers of blinking of the lamp and the length of the blinking.

The input switch 3 can feed the ON/OFF information into ECU, and, normally, it is possible to use a switch used for other purposes such as initializing the air pressure information.

As described above, it is possible to utilize any ECU that is equipped with a switch capable of feeding the ON/OFF information into this unit as an apparatus for alarming abnormality of tire air pressure of the present invention.

The non-volatile memory 4 is a memory that is configured so that the memory will not be erased even if the power is turned off. It is possible to use, for example, EEPROM (Electrically Erasable and Programmable ROM).

Moreover, it is possible to use a volatile memory 5 to which a backup power supply 6 is connected instead of the non-volatile memory 4. In this case, it is possible to use a static RAM (SRAM), a dynamic RAM (DRAM) and the like as a volatile memory 5.

Thus, the present invention is configured so that the information in the special operation mode will not be erased even if the engine, ignition, or battery cord is disconnected.

The apparatuses for alarming abnormality of tire air pressure as shown in FIGS. 1 and 2 operate in accordance with the flow chart shown in FIG. 3. Thus, when the driver turns on the ignition (step 11), it is judged whether or not the input switch is pressed (step 12), the information of the special operation mode is displayed on the lamp if the input switch is pressed (step 13), and the normal operation mode is conducted if the input switch is not pressed (step 14).

As described above, the information is displayed on the display section (lamp) only by turning the key while pressing the input switch. This information indicates the contents of the failure of the internal and external failure of the apparatus for alarming abnormality of tire air pressure with a failure code (failure code display mode) when the special operation mode is a self diagnosis mode, and indicates the position of an abnormal tire when the special operation mode is an abnormal tire position display mode.

Figure 4:
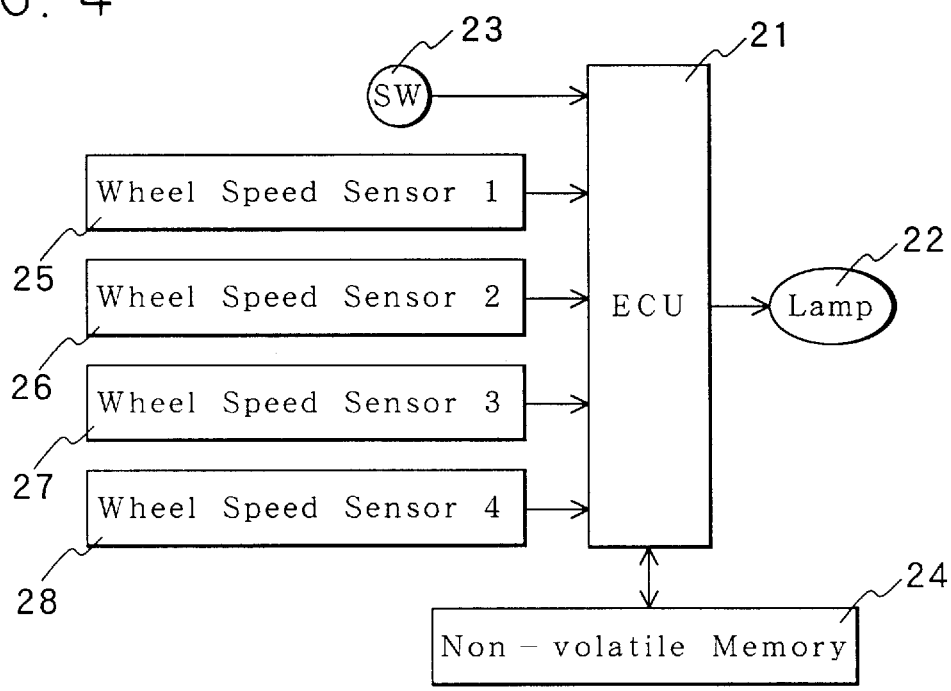
FIG. 4 is an illustration of still another embodiment of an apparatus for alarming abnormality of tire air pressure of the present invention.

Next, another embodiment of an apparatus for alarming abnormality of tire air pressure of the invention is described based on FIG. 4 and FIG. 5. This embodiment has the configuration of (2). As shown in FIG. 4, in this apparatus for alarming abnormality of tire air pressure, an ECU21 is equipped with a lamp 22 as a display section, an input switch 23, a non-volatile memory 24, and wheel speed sensors 25–28.

It is possible to use sensors that are used in ABS (Antilock Braking System), TCS (Traction Control System), and DSC (Dynamic Stability Control) for the wheel speed sensors 25–28. The apparatus is configured so that the special operation mode is not entered unless the wheel speed sensors 25–28 detect that the speed of the wheel is zero even if the ignition is turned on while pressing the input switch 23.

Moreover, it is possible to provide a volatile memory and backup power supply instead of the non-volatile memory like in the case shown in FIG. 2.

In this apparatus for alarming abnormality of tire air pressure, no information will be displayed on the display section (lamp) since the wheel speed sensors do not feed the signal of wheel speed zero even if the key is turned while pressing the input switch at the time when the wheel is rotating under the neutral state due to the trouble.

The apparatus for alarming abnormality of tire air pressure shown in FIG. 4 operates in accordance with the flow chart shown in FIG. 5. Thus, when the driver turns on the ignition (step 31), it is judged whether or not the input switch is pressed (step 32), and, if the input switch is pressed, then, it is judged whether the wheel speed is zero or not (step 33), the information of the special operation mode is displayed on the lamp if the wheel speed is zero (step 34). Moreover, if the input switch is not pressed (step 32), the normal operation mode is conducted (step 35). The normal operation mode will be also conducted when the wheel speed is not zero.

As described above, the apparatus for alarming abnormality of tire air pressure in the present invention is capable of preventing a dangerous action such that the driver reads a failure code or the position of a tire having abnormal internal air pressure while driving a vehicle, and, when conducting entry, it is possible to conduct an entry operation by using a simple procedure.

Though several embodiments of the present invention are described above, it is to be understood that the present invention is not limited only to the abovementioned and various changes and modifications might be made in the invention without departing from the spirit and scope thereof.

What is claimed is:

1. In a vehicle having a plurality of inflated tires, a warning apparatus having first and second diagnostic modes, comprising:

a display for displaying information in both the first and second diagnostic modes, said displayed information in the first diagnostic mode being different from, but related to, said displayed information in the second diagnostic mode;

a memory for storing said information displayed in the second diagnostic mode;

at least one sensor for detecting rotational movement of the tires; and a switch constructed and arranged to cause entry into the second diagnostic mode when said switch is actuated during a power-up operation, when said sensor detects no rotational movement of the tires.

2. The warning apparatus as claimed in claim 1, wherein said memory is a volatile memory powered by a back-up power supply.

3. The warning apparatus as claimed in claim 1, wherein said memory is a non-volatile memory.

4. The warning apparatus as claimed in claim 1, wherein said display is a lamp unit.

5. The warning apparatus as claimed in claim 1, comprising an electronic control unit constructed and arranged to detect and identify an abnormality in operation of the vehicle, wherein said information displayed in the first diagnostic mode is an indication that said abnormality exists, and said information displayed in the second diagnostic mode describes a specific aspect of said abnormality.

6. The warning apparatus as claimed in claim 5, wherein said abnormality is an abnormality in tire pressure, said information displayed in the first diagnostic mode identifying that at least one tire has an abnormal tire pressure, and said information displayed in the second diagnostic mode identifying which tire has an abnormal tire pressure.

* * * * *